United States Patent [19]
Bryant et al.

[11] Patent Number: 5,195,181
[45] Date of Patent: Mar. 16, 1993

[54] MESSAGE PROCESSING SYSTEM HAVING SEPARATE MESSAGE RECEIVING AND TRANSMITTING PROCESSORS WITH MESSAGE PROCESSING BEING DISTRIBUTED BETWEEN THE SEPARATE PROCESSORS

[75] Inventors: Stewart F. Bryant, Redhill, England; Michael J. Seaman, San Jose, Calif.

[73] Assignee: Digital Equipment Corporation, Maynard, Mass.

[21] Appl. No.: 820,299

[22] Filed: Jan. 10, 1992

[51] Int. Cl.[5] ............................................. G06F 13/00
[52] U.S. Cl. ................................................. 395/200
[58] Field of Search ................... 364/DIG. 1, DIG. 2, 364/200, 275, 325, 500, 908, 916

[56] References Cited

U.S. PATENT DOCUMENTS 4,414,620 11/1983 Tsuchimoto et al. ................ 395/200
4,744,023 5/1988 Welsch ............................. 395/200 X Primary Examiner—Robert L. Richardson
Attorney, Agent, or Firm—Kenyon & Kenyon

[57] ABSTRACT

A scheme for efficient implementation of workload partitioning between separate receive and transmit processors is provided so that a message can be effectively moved through a multiprocessor router. Generally, each receiving processor collects, into a digest, information relating to network protocol processing of a particular message, obtained via sequential byte processing of the message at the time of reception of the message. The information placed into the digest is information that is necessary for the completion of the processing tasks to be performed by the processor of the transmitting line card. The digest is passed to the transmit processor through a buffer exchange between the receive and transmit processors. The transmit processor reads the digest before processing of the related message for transmission and uses the information in the network protocol processing of the message. Thus, the transmit processor does not have to "look ahead" to bytes of the message needed to complete certain processing functions already completed by the receive processor and does require extra buffering and/or memory bandwidth to make the modifications to the message.

8 Claims, 8 Drawing Sheets

FIG. 7

| PHASE V DATA PACKET |
|---|
| NLPID |
| Length |
| Version |
| Lifetime |
| Flags + type |
| Segment length |
| Checksum |
| Dest addr length |
| Dest addr  ⋮ le 20bytes |
| Source addr length |
| Source addr  ⋮ le 20bytes |
| Data unit identifier |
| Segment offset |
| Total length |
| QOS opt ident |
| QOS opt len |
| QOS opt value |
| Data  ⋮ |

| PHASE V DATA PACKET DESCRIPTER |
|---|
| Descriptor type |
| Flags |
| Packet length |
| ARE result flags |
| Destination port + flags |
| Next hop physical address |
| Level 3 data offset |
| Seg offset byte posn |
| Segment offset |
| QOS byte posn |
| QOS opt value |
| Source line card # |
| Reason |
| Last hop transmitted physical address |

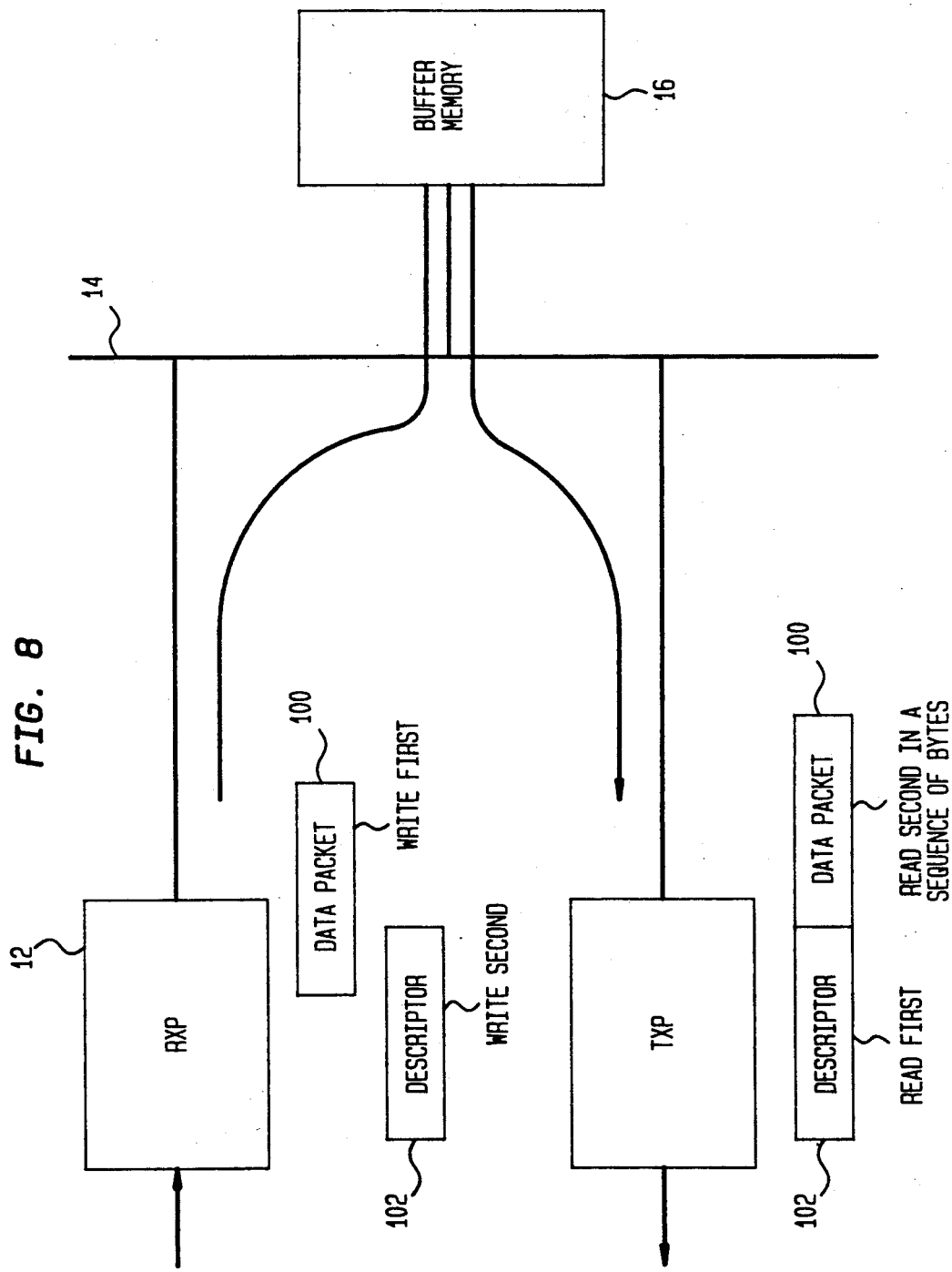

MESSAGE PROCESSING SYSTEM HAVING SEPARATE MESSAGE RECEIVING AND TRANSMITTING PROCESSORS WITH MESSAGE PROCESSING BEING DISTRIBUTED BETWEEN THE SEPARATE PROCESSORS

FIELD OF THE INVENTION

The present invention is directed to message processing and, in particular, to an efficient method and apparatus for processing messages by separate and independent receive and transmit processors.

BACKGROUND OF THE INVENTION

The capability of computers to communicate with one another has become a basic attribute of modern information processing. There is an ongoing proliferation of user applications that depend upon the ability of a computer running one of the user applications to send and receive data to and from other computers. The communication capability is necessary for the user application to be able to complete the task for which the application was developed or to communicate information to other users within a group or organization. A particular application may be designed, for example, to call subroutines running on another computer for certain data processing functions or to results.

An important objective in providing a communication capability among computers is to make all of the database and processing resources of the group or organization available to each user in the group or organization. In response to the growing need for sophisticated communication capabilities among computers, network, routing and bridging protocols such as IP, DECnet, OSI standard ISO 8473, etc. have been developed to control data transmissions between computers linked to one another in a network. The various protocols are implemented in transmission services used to couple computers to one another.

Each protocol is typically defined in terms of a number of layers, with each layer relating to a certain aspect of the functionality required for data transmissions throughout a network. For example, the first three layers are defined as a physical layer, a data link layer and a network layer. The physical layer is directed to the physical and electrical specifications of a physical link, for example, a bus, that couples the computers of a network to one another. The physical layer controls bit transmissions through the link so that a series of bits of a data packet can be communicated from one computer on the network to another computer on the network. The physical layer will set the voltage levels for logical ones and zeros, the timing of stable bit information on a physical link and so on, as necessary to transmit the bits of a data packet over the physical link.

The data link layer is directed to the packaging or framing of bits received in a data transmission into a defined packet that is free of transmission errors. The data link layer creates and recognizes boundaries between bits to define bit fields. The bits between boundaries provide structure and meaning to the bits of a data packet. For example the data packet can include a header, comprising the first n bits of a transmission, for computer source and destination information, the length of the data packet in bytes, the network protocol being used and so on. The header can be followed by framed bytes of data comprising the actual message being communicated between two or more computers on the network.

The network layer is directed to the control of routing information required to direct a message from a source computer to a destination computer of the network. Each protocol will define the length and content for a network address to uniquely identify each source or destination of data packets and the processing scheme for routing a data packet through a network. The network address information is in one of the bit fields of a data packet, as framed by the data link layer processing scheme, defined by the protocol.

Networks are generally arranged into local area networks (LANs) and wide area networks (WANs). A LAN couples computers that are physically located relatively close to one another, as for example in the same building. A WAN couples computers that may be located in different cities or indeed on different continents. A WAN usually includes components such as a router to receive a data packet from a computer on one LAN and to forward the data packet to a computer on another LAN. The router processes a network address of a data packet according to a protocol implemented in the transmission service used on the network to determine how the data packet is to be routed, e.g., to another router directly coupled to the receiving LAN or to an intermediate router, etc. Each router stores information on the topology of the network for use in routing each data packet.

A bridge is another component that may be utilized to transfer data packets from computers of one LAN to computers of another LAN. A bridge intercouples different LANs and monitors communications within and between the LANs to "learn" source and destination address information. The bridge continuously learns and "ages" address information to accommodate the transfer of a data packet between the LANs.

A problem concerning computer communications is encountered when a user application running on a computer in a first network utilizing a first data transmission service needs to communicate with a computer coupled to another network utilizing a different data transmission service. The efficacy of any routing protocol or a multi-protocol routing scheme is dependent upon the ability to transmit data packets between computer networks utilizing different transmission services. Thus, there is a need for a network server that can receive and transmit messages between different transmission services.

SUMMARY OF THE INVENTION

The present invention is directed to a method and apparatus for processing messages by separate and independent receive and transmit processors. The invention can be implemented in, e.g., a network integration server that provides, in a single device, network connectivity between any number of different user applications running on various computers in a computer network by implementing a mapping scheme between the user application services available on the constituent computers of the network and a multiplicity of transmission services that may be used in different parts of the network. The network integration server is arranged as a backplane based system that generally comprises a plurality of line interface cards and a shared, centralized memory services card. The line interface cards and the memory services cards are coupled to one another by the backplane bus.

Each line interface card operates autonomously and includes all of the circuitry and logic required to process the physical and data link layers of a particular transmission service. In addition, each line interface card includes a data link layer and network layer processor for the data link and network protocols utilized by computers linked by the particular transmission service. The network layer processor can also implement a multi-protocol routing scheme, such as the multi-protocol IS-IS standard to permit the simultaneous use of different network protocols on the same physical network. Each line interface card is coupled by a port or ports to a network that operates according to the transmission service supported by the line interface card.

The line interface cards communicate with one another over the backplane bus. The backplane bus is used in appropriate bus transactions to affect a transfer of each of the actual messages of each data packet received by any one of the line interface cards to one of the other line interface cards for transmission out of the network integration server to another transmission service.

The shared memory card provides centralized network routing and bridging information services to the network layer processors of the line interface cards. The centralized routing and bridging services are implemented in an address recognition engine. The address recognition engine accesses a routing and bridging information look-up database on behalf of the line interface cards. For each data packet received by a line interface card, the receiving network layer processor extracts the network destination address and passes the address as a "request" to the address recognition engine.

The address recognition engine reads each request and uses the address contained in the request as an index to the information database for lookup of a corresponding entry. A portion of the corresponding entry is returned to the line interface card as a "response" that is then read by the processor. The response includes routing or bridging information having an indication as to which line interface card of the network integration server is to get the data packet corresponding to the request/response for transmission out of the network integration server.

The shared memory card also includes a system pool memory. The pool memory provides a shared memory for transferring a data packet from a receiving line interface card to a transmitting line interface card. The pool memory is divided into a plurality of buffers that are swapped between receiving and transmitting line interface cards through the transfer of buffer pointers according to a buffer swapping protocol feature of the present invention.

In this manner, a data packet can be written into a preselected buffer of the pool memory by a receiving line interface card. The receiving line interface card then swaps a pointer to the buffer for a pointer to a next available buffer owned by the transmitting line interface card indicated in the response. The transmitting line interface card can then read the data packet form the preselected buffer of the pool memory, process the data packet according to the network protocol supported by the particular line interface card and then transmit the server.

A set of bus transactions over the backplane bus are consistently performed for each data packet received by any one of the line interface cards to exchange a request and response and to transfer the data packet to an appropriate line interface card for transmission out of the network integration server. The network integration server simplifies routing and bridging processing by providing autonomous operation of each line interface card, in respect of the transmission service supported by the line interface card, centralizing the address recognition operation and requiring that all data packets be processed in the same manner, via the set of bus transactions.

After receiving a message, the processor of a receive line interface card strips off the data link information from the message header and passes the stripped message to the intended transmitting line interface card. The processor of the transmitting line interface card then adds a data link field to the header of the message, as required by the transmission service supported by the transmitting line card. Thus, routed data messages are processed by separate receive and transmit processors of the receive and transmitting line interface cards, respectively, to provide message connectivity between dissimilar transmission services. For example, a message can be received from an Ethernet system and transmitted out on an FDDI or T1 transmission service.

Generally, at the network layer, a processor examines a data message, byte by byte, to obtain network information, and thereafter modify certain fields of the message as a function of the protocol. The total processing workload required by a network protocol to process a message for routing through the network integration server described above is partitioned between the receive and transmit processors for accurate and efficient operation. For example, the processor of a receiving line card can process a received data message to determine the validity of the message, the handling of options provided by the particular network protocol and the output circuit to be used to transmit the message.

However, as should be understood, each data message is stored in a buffer of the system pool memory for a certain period of time before the transmitting line card is passed a pointer to the buffer and the message is read by the transmitting line card from the buffer for transmission. Thus, the network protocol processing functions relating to message aging and network congestion state at the time of transmission are performed by the processor of the transmitting line card. In addition, certain network protocols, such as ISO 8473, permit further modifications to messages, such as segmentation of a message, that are properties of an output circuit, and therefore more easily performed by the processor of a transmitting line card.

The present invention provides a scheme for efficient implementation of workload partitioning between separate receive and transmit processors so that a message can be effectively moved through a router such as the multiprocessor network integration server described above. Generally, the present invention arranges each processor of a receiving line card to collect, into a digest, information relating to network protocol processing of a particular message, obtained via sequential byte processing of the message at the time of reception of the message. The information placed in the digest comprises information that is necessary for the completion of the processing tasks to be performed by the processor of the transmitting line card.

The digest, therefore, provides a forwarding assistance function for the processor of the transmitting line interface card. The digest can include, for example, certain information from the data link layer header of a received message. The data link information can include, for example, last hop information that is used by the processor of the transmitting line interface card in the transmission of the message. Thus, rather than transfer the entire data link layer to the processor of the transmitting line card, the processor of the receiving line interface card can extract preselected information that, in most instances, is sufficient for the transmitting processor to route the associated message.

This permits an optimization of the routing functionality of the network integration server. Any messages that require the full data link header for transmit processing will be recognized by the receive processor upon examination of the bytes of the message header and can be forwarded to a management processor provided in the network integration server for full routing processing.

The digest is passed to the transmit processor through a buffer exchange between the receive and transmit processors via a buffer of the system pool memory, along with the message. In one embodiment of the present invention, the digest is stored in a reserved space of the buffer used to transfer the message. In this manner, the transmit processor receives a digest for each message that it is to transmit.

The transmit processor reads the digest before processing the related message for transmission and uses the information contained in the digest to perform the network protocol processing of the message. Thus, the transmit processor does not have to receive the entire data link header of a message nor does the transmit processor have to "look ahead" to bytes of the message needed to complete certain processing functions already completed by the receive processor. The digest also removes the need for extra buffering and/or memory bandwidth to make modifications to the message. This approach eliminates the need to redo tasks previously performed by the receive processor at the time of reception of the respective message and streamlines the overall processing when the processing workload is partitioned between separate receive and transmit processors.

BRIEF DESCRIPTION OF THE DRAWINGS

FIG. 7 is an illustration of an example of a header of a DECnet Phase V protocol data packet and a descriptor digest for the data packet according to the present invention.

FIG. 8 is a block diagram illustrating an example of the generation and use of a descriptor digest by receive and transmit processors according to the present invention.

DETAILED DESCRIPTION

Figure 1:
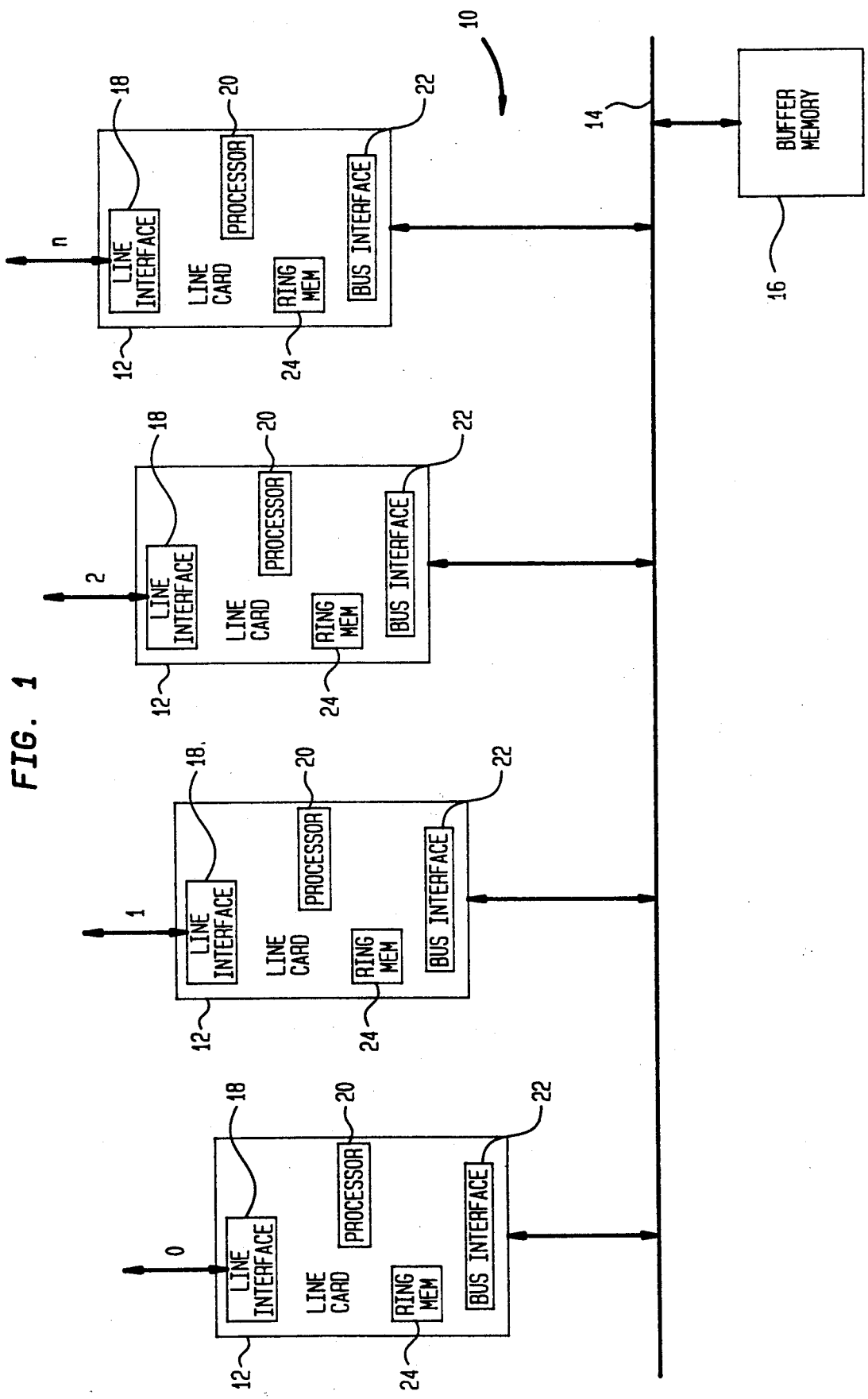
FIG. 1 is a block diagram of a representative multiprocessor computer system implementing the two pass message processing scheme of the present invention.

Referring now to the drawings, and initially to FIG. 1, there is illustrated a multiprocessor computer system generally designated by the reference numeral 10. In the illustrated system, a plurality of line cards 12 is arranged so that each line card 12 is coupled to a backplane bus 14. A central buffer memory 16 is also coupled to the bus 14 to provide a system pool memory so that the line cards 12 can access the central buffer memory 16 to read and write messages that are to be communicated between the line cards 12.

There are n line cards 12, designated O to n, which together provide a multi-protocol router/bridge in a computer network (not illustrated). Each line card 12 comprises a line interface 18, a processor 20, a bus interface 22 and a ring memory 24.

Each line interface 18 is adapted to be coupled to a data transmission service, such as, e.g., $T_1$ or 64 K bps services provided by long distance telecommunication companies, to receive and transmit data packets from and to other components of the computer network. The line interfaces 18 are each configured to provide physical and data link level functionality according to a network which the particular line interface 18 is to be coupled.

The processor 20 of each line card 12 performs routing or bridging processing in respect of data packets received at or to be transmitted from the respective line card 12. On the receive side, each processor 20, e.g., examines the network address contained in the header of a received data packet to determine which line card 12 should be utilized to transmit the data packet for continued routing or bridging within the computer network. The receive processor can also examine the entire packet to verify its validity and to determine how certain options provided by the protocol being used to transmit the packet, are to be handled.

Each data packet is then handled as a "message" to a processor 20 of the line card 12 associated with the selected output circuit, i.e., the received data packet must be transferred to the processor 20 of the transmitting line card 12 for processing and eventual transmission via the line interface 18 of the other line card 12. Each processor 20 will be primarily processing data packets that are received from other processors 20 or are to be communicated to other processors 20, to complete the transmission of data packets through the router or bridge provided by the multiprocessor computer system 10.

To that end, each processor 20 will store each received message in a free buffer in the buffer memory 16 via the respective bus interface 22 of the line card 12. The bus interface 22 operates according to a bus protocol implemented on the bus 14 to acquire control of the bus 14 and thereafter perform a write operation into the selected buffer of the buffer memory 16 via the bus 14. According to the present invention, a pointer to the buffer is then transmitted to the processor 20 of the transmitting line card 12 which utilizes the pointer to read the full data packet from the buffer memory 16 for network processing and eventual transmission.

The ring memory 24 of each line card 12 is divided into n buffer rings, one dedicated to each of the other line cards 12 of the system 10 and one dedicated to the processor 20 of the same line card 12. (In the exemplary system, a data packet received by a line card 12 that is ultimately to be transmitted by the same line card 12, is sent through the same message forwarding scheme as other data packets from the line card back to the line card.) The ring memories 24 are each used to store pointers from the other line cards 12 until the processor 20 of the line card 12 can perform a read bus transaction over the bus 14 to read the full data packet from the central memory 16.

Figure 2:
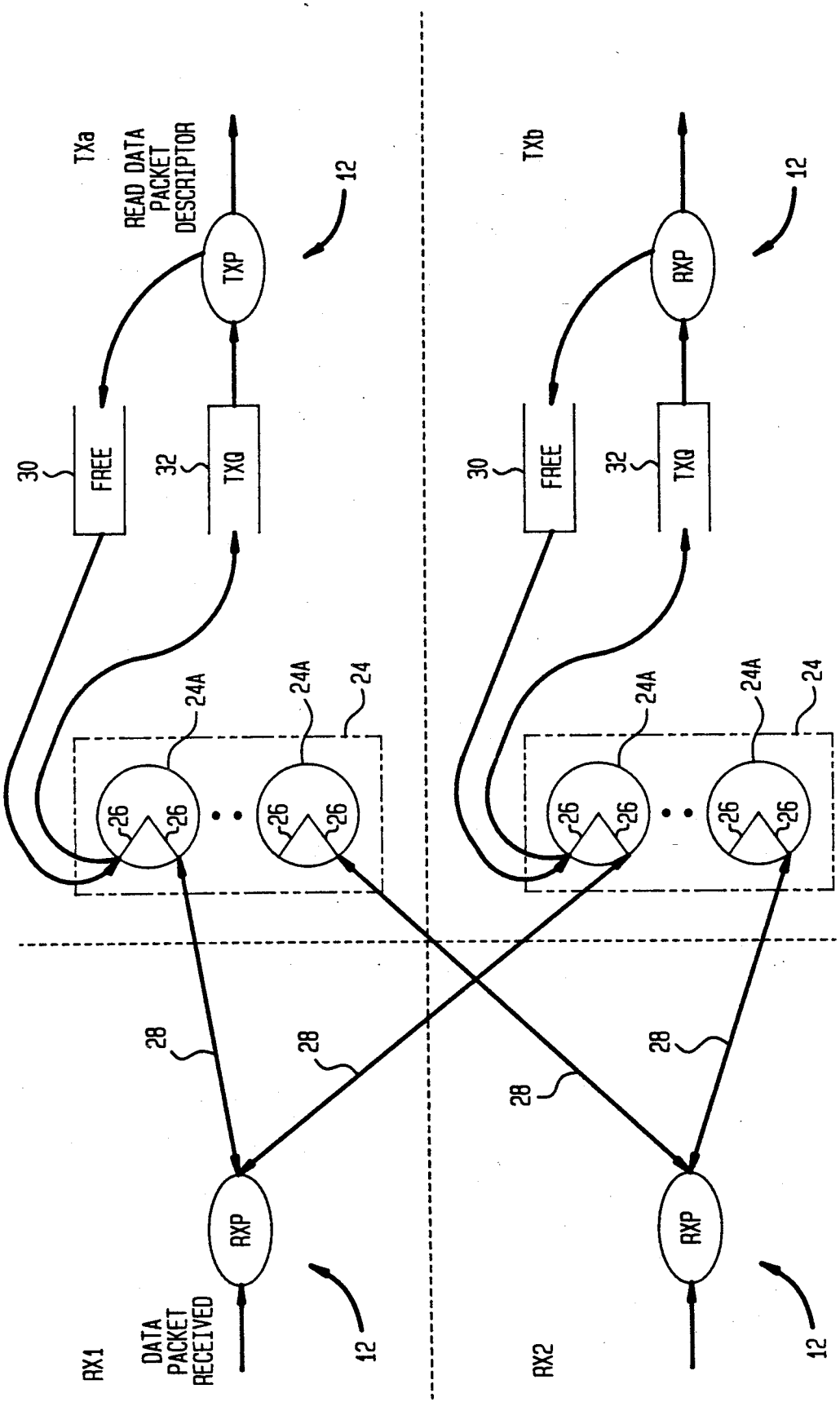
FIG. 2 is a schematic representation of a buffer swapping scheme, as implemented in the computer system of FIG. 1.

Referring now to FIG. 2, there is illustrated a schematic representation of the buffer swapping scheme according to the present invention. Each of RX1 and RX2 represents one of the line cards 12 when the respective line card is acting as a receiver of data packets and Txa and Txb each represent one of the line cards 12 when the respective line card is acting as a transmitter of data packets. RXP represents a data packet receive module provided at each processor 20 of a line card 12 to process each received data packet while TXP represents a data packet transmit module provided at each processor 20 of a line card 12 to process each data packet for transmission.

As described above, each buffer ring memory 24 is divided into n rings 24A, with each ring having a preselected number of memory locations 26 for the storage of pointers to buffers in the central memory 16. Moreover, each ring 24A is dedicated for use by one of the RXP modules, as illustrated by the lines 28. A FREE buffer queue 30 and a transmit (TXQ) buffer queue 32 is maintained by the TXP module of each lien card 12.

When an RXP module needs to communicate a message (data packet) previously stored in a buffer of the central memory 16, to a particular TXP module, it will first read a location 26 of the dedicated ring 24A of the respective line card 12. Each RXP can, e.g., maintain a ring pointer for each dedicated buffer ring 24A. Each ring pointer contains an address to a location 26 of the corresponding buffer ring 24A that is to be read during a particular transaction. The RXP module will increment the address value after each transaction to continuously traverse the ring buffer 24A.

Figure 5:
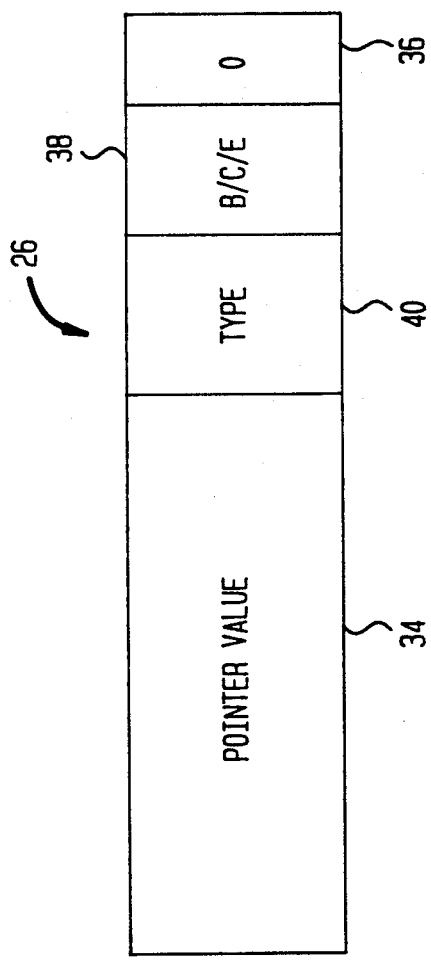
FIG. 5 is a block diagram of a pointer storage location.

Referring for a moment to FIG. 5, each location 26 includes a pointer value field 34 to store a pointer to a buffer of the central memory 16 and an ownership field 36 that comprises one bit representing either a set state or a clear state. The set state can represent ownership of the location 26 by the RXP module (the source processor) while the clear state can represent ownership of the location 26 by the TXP module (the destination processor). When the location 26 read by the RXP module is owned by that module, the pointer value 34 (See FIG. 5) is a pointer to a free buffer of the central memory 16. The RXP module will read the pointer value and store that value for use in a subsequent message transfer, as will appear.

The RXP module will then write the pointer value 34 for the central memory 16 and change the state of the ownership field 36 to indicate ownership by the TXP module of the line card 12.

Each TXP module is arranged to poll the locations 26 of the rings 24A located at the respective line card 12. When a location 26 is owned by the TXP module, the pointer value 36 stored at that location 26 is read and loaded into the TXQ queue 32. At that time, the TXP module will also write a pointer value from the FREE queue 30 into the location 26 and change the ownership bit to once again indicate that the location 26 is owned by the RXP module.

The TXP module will service each pointer loaded into the TXQ queue, as, e.g., on a FIFO basis, to access the central memory for each complete message. After the TXP module has read the complete message associated with a particular pointer value, it will transfer that pointer value to the FREE queue 30 for use in a future buffer swap operation.

Figure 3:
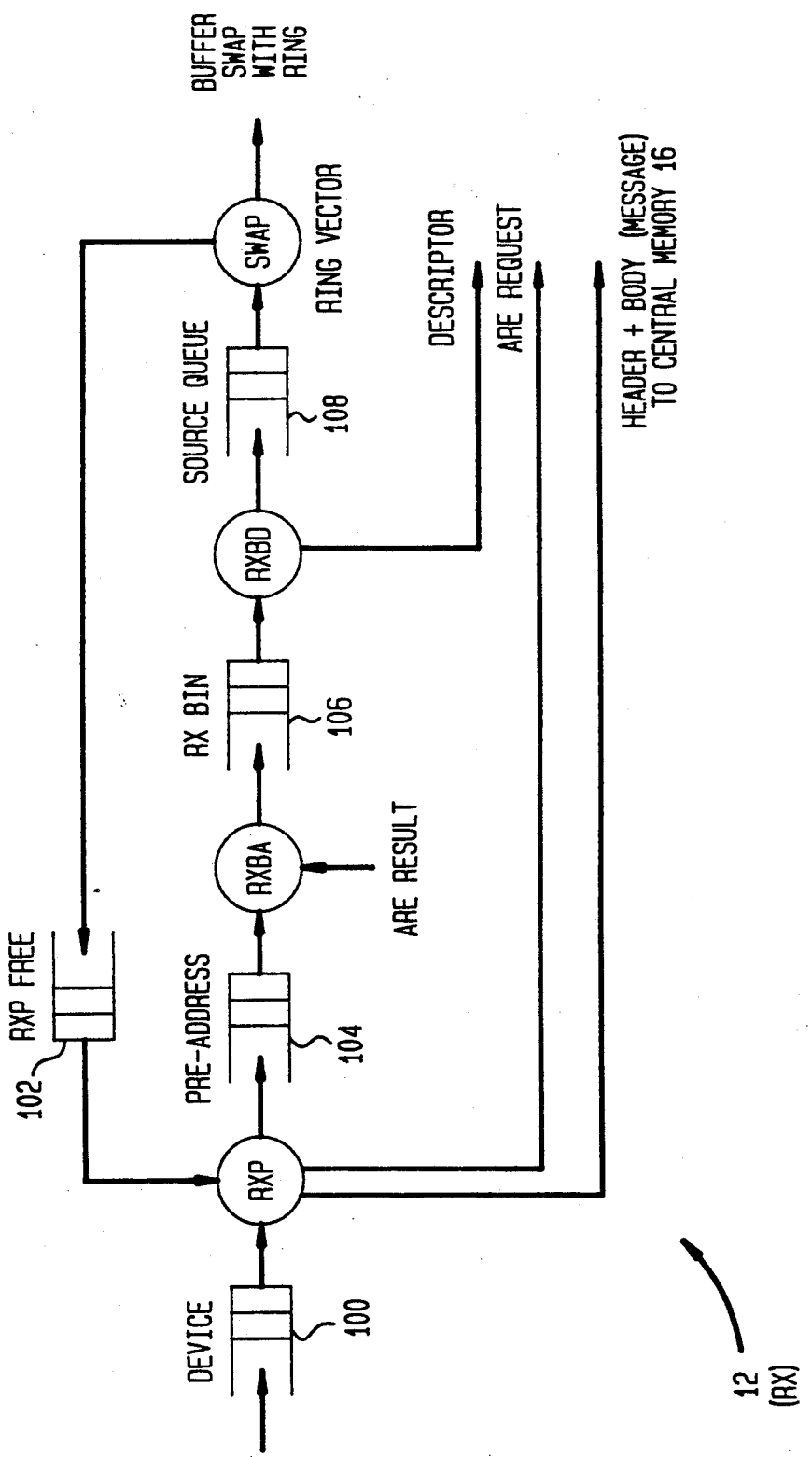
FIG. 3 is a software block diagram of a source processor performing a buffer swap in respect of a message to be transmitted to a destination processor, including the passing of a descriptor digest relating to the message.
Figure 4:
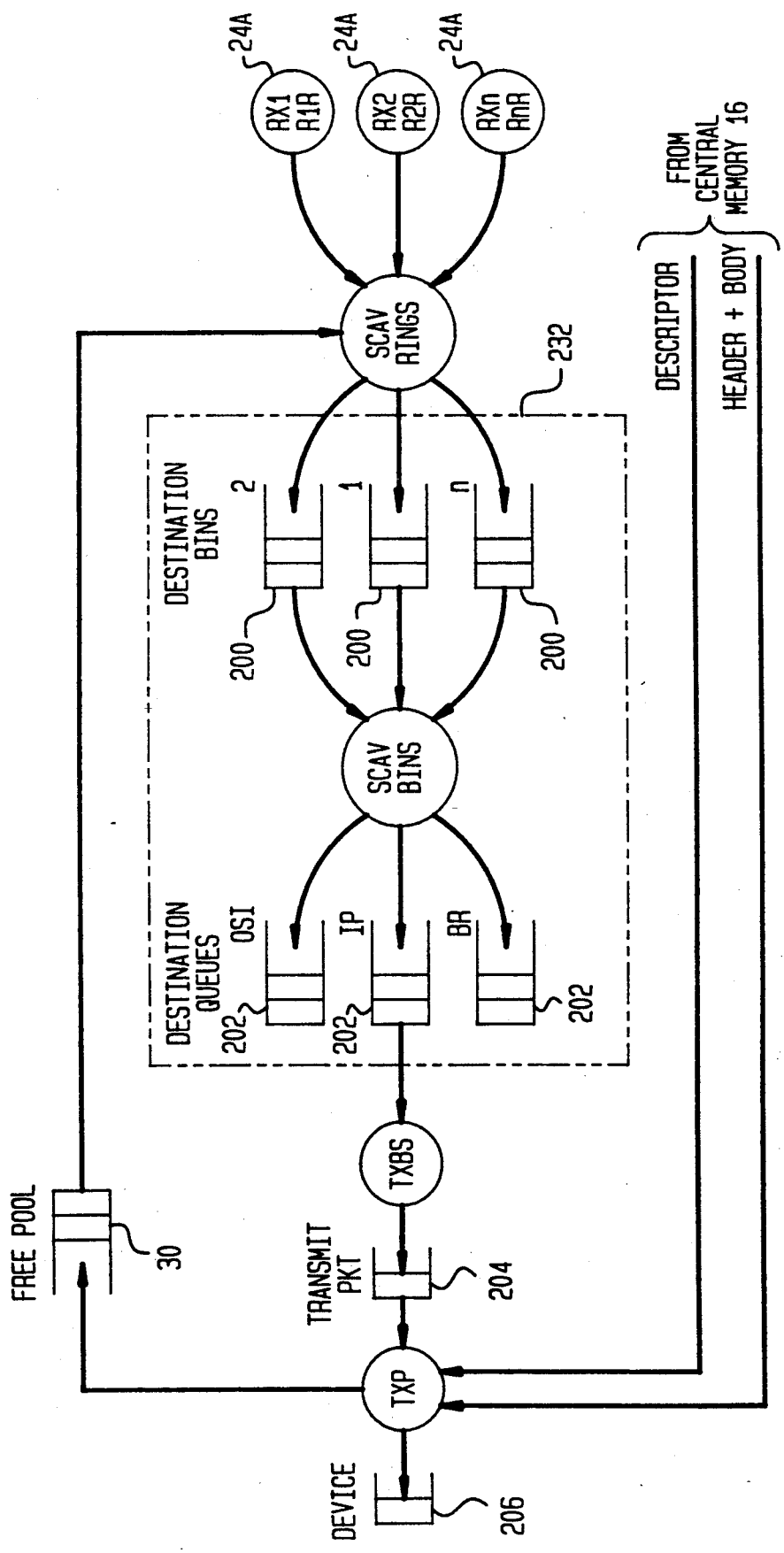
FIG. 4 is a software block diagram of a destination processor performing a buffer swap in respect of a message transacted by a source processor.

In this manner, buffers are automatically and continuously swapped between line cards 12 to facilitate message communication with a guaranteed return supply of free buffers. FIGS. 3 and 4 illustrate the above described buffer swapping scheme, in greater detail, in respect of source and destination message processing, respectively. As illustrated in FIG. 3, each complete message (data packet) is loaded into a DEVICE queue 100. The RXP module reads the messages, one at a time, from the DEVICE queue 100 and examines the header of each data packet to extract the network address, as is known in the art, for determination of which TXP module is to receive the message (data packet) for transmission.

To that end an ARE request comprising the network address, is transmitted to an address recognition engine (not illustrated) for relevant network information including the identity of the TXP module to be used to transmit the data packet. The RXP module also writes the data packet to a buffer in the central memory 16. An RXP free buffer queue 102 stores a plurality of free buffers acquired from previous buffer swaps. The RXP module will read a top free buffer pointer from the queue 102 and write the current data packet to the buffer pointed to by the pointer. The RXP free buffer queue 102 enables the RXP module to pipeline data packet processing, i.e. the RXP module can begin to process a subsequent data packet from the DEVICE queue 100 before the return of a free buffer in respect of an immediately preceding data packet(s) by storing several free buffer pointers in the RXP free queue 102.

As should be understood, the data packet is written to the central memory buffer pointed to by the pointer obtained from the RXP free buffer queue 102 via a bus transaction over the bus 14 utilizing the bus interface 22 of the respective line card 12. The RXP module then writes the pointer value into a Pre-ADDRESS queue 104.

RXBA is a sub-module of the RXP module arranged to receive the ARE result and associate the result, including the identity of the TXP module to be used to transmit the data packet, with the pointer value for the data packet central memory location. The associated pointer/TXP information is loaded by the RXBA module into an Rx BIN 106 for eventual input to an RxBD module.

Pursuant to a feature of the present invention, the RxBD module utilizes the input information to generate a descriptor digest containing network information relevant to the data packet. The descriptor is also written by the RxBD module to the buffer of the central memory where the data packet itself is stored, for use by the TXP module in transmit processing.

Referring now to FIG. 7, there is illustrated an example of a data packet header and a descriptor digest for the data packet. The example comprises a header for a data packet transmitted according to the DECnet Phase V network protocol. The left hand side of the figure illustrates the header for a DECnet Phase V data packet with the data of a message appended thereto. The right hand side illustrates the corresponding descriptor digest generated by the RxBD module. The descriptor digest contains various fields relating to the type of protocol, flags relating to features of the protocol, such as, for example, whether segmentation is permitted, selected information from the response provided by the address recognition engine, information on the destination port and the position and values for certain fields of the particular DECnet Phase V header.

Generally, the descriptor is arranged to contain any network processing information performed by the RxP module that is also needed in the transmit processing performed by the TXP module. As described above, the receiving processor examines the entire data packet to verify its validity. Thus, the entire packet is read and the receiving processor has the opportunity to generate and save the information required by the transmitting processor.

The RxBD module passes each associated pair of pointer/TXP information to a SOURCE queue 108.

A SWAP module removes associated pairs of pointer/TXP information from the SOURCE queue 108 and performs the two bus transactions described above, over the bus 14, in respect of an owned location 26 of a corresponding ring 24A of the TXP module associated with a particular pointer in the pointer/TXP information. The free buffer obtained via the first bus transaction is loaded into the RXP free buffer queue 102 for use by the RXP module in subsequent message communications and the pointer obtained from the SOURCE queue 108 is written to the current location 26 of the corresponding ring 24A. The SWAP module also changes the ownership bit to indicate TXP ownership of the current location 26.

Referring now to FIG. 4, a ring polling module, SCAV RINGS, at each processor 20 of a line card 12, polls each location of the n rings 24A associated with the line card 12 to locate owned locations 26. The SCAV RINGS module is responsible to read the pointer of each owned location 26 and thereafter write a pointer from the FREE queue 30 into that location 26. The SCAV RINGS module will also change the ownership bit of the location 26 back to the RXP ownership state.

As illustrated in FIG. 4, the TXQ queue 32 comprises a set of destination bins 200 and a set of destination queues 202. Each destination bin 200 is dedicated to one of the rings 24A and each destination queue 202, in our representative embodiment of a multi-protocol router/bridge, is dedicated to a particular network protocol or bridging protocol, e.g., the OSI and IP network protocols and BR representing a bridging protocol. The bin/queue set arrangement is used to segregate messages, first by source and then by protocol type. This feature of the present invention provides flexibility in message handling, in respect of the source of the message and the type of message, as will appear.

Referring once again to FIG. 5, each location 26 includes a "beginning/continuation/last" marker field 38. All of the buffers of the central memory 16 are of equal size to make certain that an equal amount of buffer space is swapped in each free buffer/message buffer exchange. The "beginning/continuation/last" marker field 38 provides a mechanism to link buffers together for communication of messages too large to be stored in a single buffer.

When an RXP module is communicating a message (data packet and associated descriptor) that is too large for a single buffer of the central memory 16, it will communicate the message in several buffers and link the buffers via the "beginning/continuation/last" marker field. The first portion of the message is placed in a first buffer and the RXP module sets the "beginning/continuation/last" marker field of the pointer to the first buffer to indicate a "beginning" buffer. Buffers containing subsequent portions of the message are each stored in the central memory 16 with the respective marker fields of the respective pointers each set to indicate "continuation" until the last portion of the message. As should be understood, the RXP module will set the marker field for the buffer pointer containing the last portion of the message to indicate "last". The beginning, continuation and last buffer pointers will be stored in contiguous locations of the appropriate buffer ring 24A associated with the destination processor.

However, to implement a fair polling operation in the SCAV RINGS modules of the processors 20, each SCAV RINGS module can be arranged, e.g., to poll a location of a particular ring 24A and move on to each other ring 24A before returning to a next location of the particular ring 24A. Thus, the SCAV RINGS module does not remove the pointers linked by their respective "beginning/continuation/last" marker fields in order. The several destination bins 200 are used to accommodate a fair polling operation and still maintain a contiguous relationship between linked buffer pointers transmitted by a particular RXP module. Each SCAV RINGS module loads each pointer read from a particular ring 24A into the bin corresponding to that ring 24A so that all beginning, continuation, last buffer pointers remain contiguous as they move through the transmitting line card 12.

A SCAV BINS module is used to transfer buffer pointers from the destination bins 200 to appropriate destination queues 202. As described above, each destination queue 202 is dedicated to a particular protocol. As illustrated in FIG. 5, each location 26 is provided with a TYPE field 40 which is used to indicate the protocol to be used for transmission of the data packet in the message pointed to by the pointer value. The RXP module inserts the protocol type in the TYPE field prior to the buffer swap operation. The SCAV BINS module examines the "beginning/continuation/last" marker field and TYPE field for each pointer removed from a particular bin 200 and loads all linked buffer pointers for a particular message into the destination queue corresponding to the protocol indicated in the TYPE field.

The various destination queues are also used to introduce fairness into the system by providing a preselected limited size queue for each protocol type. A TxBS module removes pointers from the destination queues 202 in a straight round robin polling operation so that there is progress in transmitting messages of each protocol type and no one protocol can prevent any other protocol from making progress in transmitting messages. The multiple destination queue 202 arrangement is useful because protocols have different characteristics such as different congestion algorithms. Certain congestion algorithms can block other protocols by dominating router operation if the round robin sequence through the various protocol types were not implemented.

The TxBS module loads pointers removed from the destination queues 202 to a TRANSMIT PACKET queue 204. The TXP module of the line card 12 removes pointers from the TRANSMIT PACKET queue 204, one at a time, and utilizes each pointer to access the central memory 16, via the bus 14, to read the header and body of a data packet and the associated descriptor (the message) for descriptor obtained from the central memory 16 is placed in a DEVICE queue 206 for processing by the transmitting processor and eventual transmission by the line interface 18 of the line card 12. In addition, the TXP module loads the pointer just used to access a message into the FREE buffer queue 30 for use by the SCAV RINGS module in a future buffer swap, as described above.

Referring now to FIG. 8, there is illustrated, in block diagram form, the multiprocessor system of FIG. 1 in the reception and transmission of a data packet. The RXP module of the receiving line card 12 first writes a received data packet 100 to a preselected buffer of the central memory 16, generates an associated descriptor digest 102 and then writes the descriptor 102 to the buffer storing the data packet. The buffer is arranged to have a reserved space at the beginning of the buffer for storage of the descriptor digest 102.

The TXP module of the selected transmitting line card 12 eventually reads the preselected buffer from the central memory 16. As illustrated in FIG. 8, the TXP module will first read the descriptor from the reserved beginning space of the buffer and then read the data packet. The descriptor will contain all of the information necessary for the TXP module to process each byte of the data packet in a sequence. Thus, if an early field of the header must be modified based upon information contained in a later field of the header, the TXP module will have that information in the associated digest and need not read ahead in the data packet. In this manner, the TXP module need only read and write each byte of the data packet once during transmit processing and does not have to redo work already performed by the receiving processor.

Figure 6A:
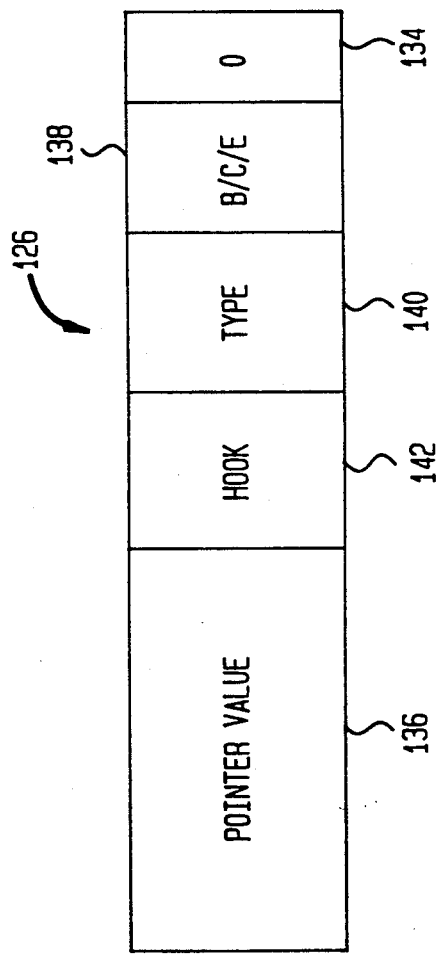
FIG. 6A is a block diagram for a pointer location used in a message broadcast.
Figure 6:
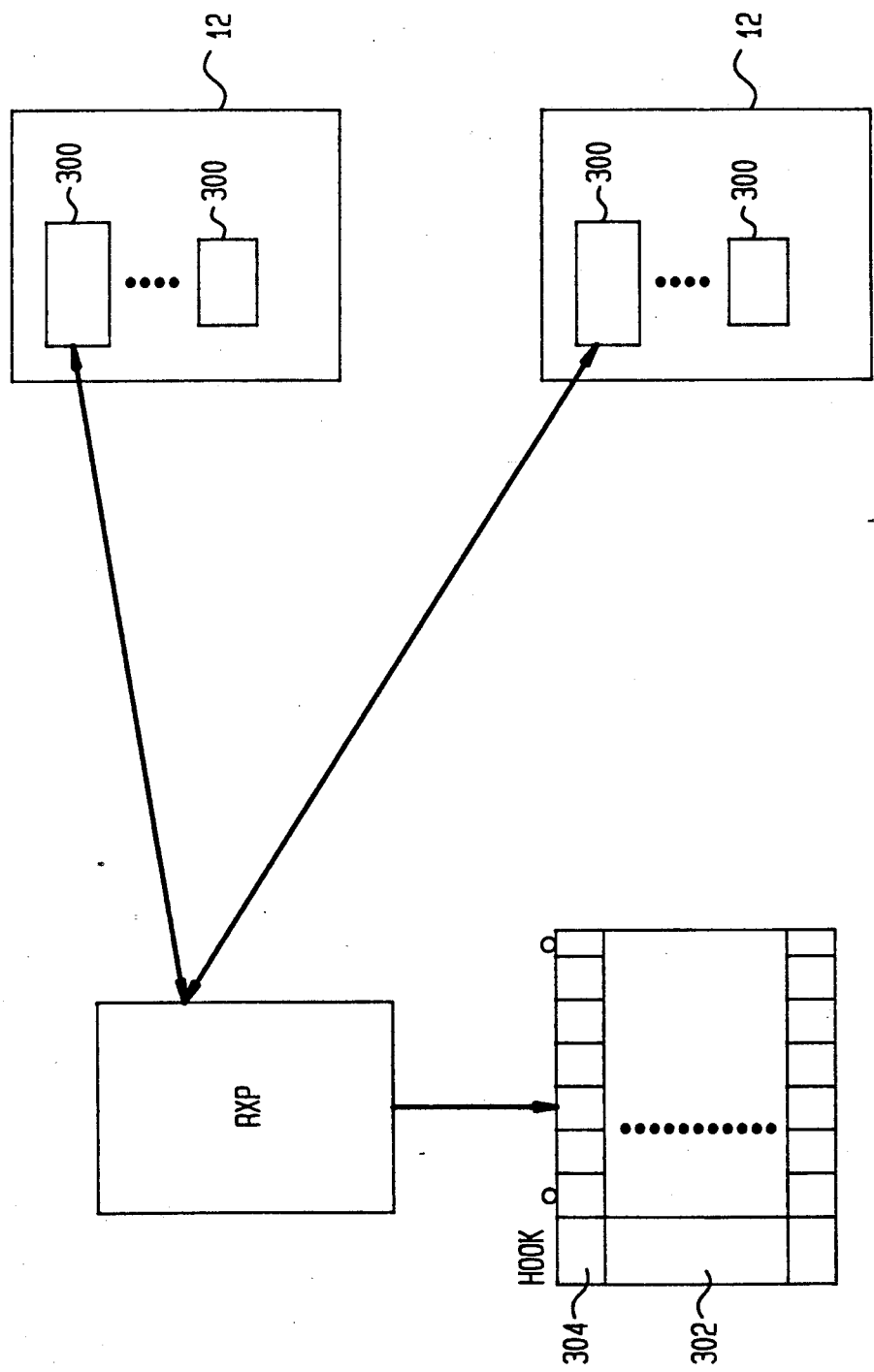
FIG. 6 is a block diagram of a mechanism for a message broadcast.

Referring now to FIGS. 6 and 6A, there is illustrated a mechanism and buffer pointer format for broadcasting a message to several destination processors for multiple transmission of a data packet, as may be required at times under certain protocols. The workload splitting feature of the present invention is advantageous in broadcast situations since each separate transmit processor can accurately perform message aging and network congestion processing for the message as the particular transmit processor is transmitting the message.

As illustrated in FIG. 6A, a broadcast pointer 126, for use in a broadcast, is provided with an ownership field 134, pointer value field 136, "beginning/continuation/last" marker field 138 and TYPE field 140, as in the buffer pointer 26 of FIG. 5. In addition, each broadcast buffer pointer 126 is formatted to include a read permission field designated as a hook 142. An RXP module generates a hook value to identify a particular broadcast buffer pointer 126 for tracking the broadcast buffer pointer 126, as will appear.

As illustrated in FIG. 6, the RXP module broadcasting a message writes a broadcast pointer 126, containing the buffer pointer value for the buffer where the broadcast message is stored in the central memory 16 and hook value, to each destination processor that is to receive the broadcast. A special broadcast queue 300 is provided at each destination processor for each potential broadcast source. Broadcast buffer pointers 126 are written into the corresponding broadcast queues of each destination line card meant to receive the message.

The SCAV RINGS modules of the destination line cards will also poll the broadcast queues for messages. The ownership bit of each location is used as in the regular message forwarding scheme to indicate whether a pointer is to a message to be read by the SCAV RINGS module. However, the hook field 142 is interpreted by the destination SCAV RINGS modules to mean that it has read only access to the pointer location of the queue. After the SCAV RINGS module reads a broadcast queue location, it will set the ownership bit to indicate that the source once again owns the location of the broadcast queue for future use.

Each source line card maintains a table 302 of hook values including an entry 304 for each specific hook value used in a broadcast pointer 126. Each entry 304 of the table 302 contains a set of bits, one for each potential destination processor. The RXP module sets only those bits at a particular entry 304 corresponding to the destination processors to which it sent the broadcast pointer 126 having the hook value of the entry 304.

The SCAV RINGS module of each destination processor receiving a broadcast message sends the hook number to the source corresponding to the broadcast queue from where it read the broadcast message. This can be accomplished via a pointer exchange according to the present invention in the broadcast queues. For example, a SCAV RINGS module will write a pointer with a hook value from a previously read broadcast message sent by a particular source into a location of the broadcast queue corresponding to the source, after it reads the location for a current broadcast message. The SCAV RINGS module change the ownership bit to indicate that the particular source again owns the location.

Upon reading each hook value during a buffer exchange in a broadcast queue, the RXP module clears, in the entry 304 of the table 302 indicated by the hook value, the bit corresponding to the destination processor sending the hook value. When all of the bits for a hook value have been cleared, the source processor knows all of the intended destination processors have received the broadcast message and the broadcast pointer is once again free for use in another message transfer.

What is claimed:

1. A computer system for transmitting messages in a computer network, which comprises:
   a message receiving processor adapted to receive messages from the computer network;
   a separate message transmitting processor coupled to the message receiving processor;
   the message receiving processor operating to perform first preselected processing of a message received by the message receiving processor and to generate a digest of information relating to the message, the digest containing network protocol processing information for message transmit processing;
   the message receiving processor transmitting the message and the digest o the message transmitting processor;
   the message transmitting processor operation to perform second preselected processing of the message using the network protocol processing information in the digest.

2. The computer system of claim 1, further comprising:
- a common memory comprising a plurality of buffers for storing messages nd associated digests from the message receiving processor o the message transmitting processor;
- each of the message receiving processor and the message transmitting processor being coupled to the common memory;
- a pointer memory coupled to each of the message receiving processor and the message transmitting processor, the pointer memory having a set of locations for storing pointers to buffers of the common memory, preselected one of the locations each storing a pointer to a buffer of the common memory that is available for use to store a message; and
- a pool of pointers to buffers of the common memory that are available for use to store messages;
- the message receiving processor storing a pointer to at least one of the plurality of buffers and operating to transfer a message and associated digest to the message transmitting processor by writing the message and associated digest to the at least one of the plurality of buffers, reading a pointer to a buffer available for use from. a preselected location of the pointer memory and writing the pointer to the one of the plurality of buffers to the preselected location of the pointer memory;
- the message transmitting processor operating to read the pointer to the one of the plurality of buffers from the preselected location of the pointer memory and to thereafter remove a pointer to a buffer available for use from the pool of pointers and to write the removed pointer to the preselected location of the pointer memory.

3. The computer system of claim 2, wherein the message transmitting processor operates to utilize the pointer to the one of the plurality of buffers to read the message and associated digest stored in the one of the plurality of buffers by the message receiving processor and after reading the message, to place the pointer in the pool of pointers.

4. The computer system of claim 2, wherein the message and associated digest of network protocol processing information are stored in the separate buffers.

5. The computer system of claim 1, wherein the message receiving processor is coupled to the message transmitting processor by a common memory comprising a plurality of buffers for storing messages and associated digests containing network protocol processing information from the message receiving processor to the message transmitting processor; and further comprising:
- a pointer exchange mechanism for exchanging pointers to the buffers of the common memory between the message receiving and message transmitting processors; and
- a pool of pointers to buffers of the common memory that are available for use to sore messages;
- the pool of pointers being coupled to the pointer exchange mechanism;
- the pointer exchange mechanism interlocking the message receiving and message transmitting processors to accept a pointer to a buffer containing a message, associated digest or both, from the message receiving processor, on a first condition that a pointer from the pool of pointers is read by the message receiving processor, and to make the pointer accepted form the message receiving processor availably to the message a transmitting processor on a second condition that the message transmitting processor places the pointer in the pool of pointers after utilizing the pointer to read the message in the buffer.

6. A message receiving processor adapted to receive messages from a computer network, and to transmit received messages to a separate message transmit processor, which comprises:
- a first module operating to perform first preselected processing of a message received by the message receiving processor and to generate a digest of information relating o the message, the digest containing network communication protocol information for second preselected message transmit processing; and
- a second module adapted to communicate the message and the digest o the message transmit processor.

7. A message transmit processor adapted for coupling to a separate message receive processor to receive messages from the message receive processor for transmission to a computer network, which comprises:
- a first module adapted to receive a message and a digest relating to the message from the message receiving processor, the digest containing network communication protocol information for message transmit processing; and
- a second module operating to perform preselected processing of the message using the network communication protocol information int h digest.

8. A method of transmitting a message through a computer system comprising the steps of:
- receiving a message at a message receiving processor;
- operating the message receiving processor to perform first preselected processing of the message to generate a digest of information relating to the message, the digest containing network protocol processing information for message transmit processing;
- operating the message receiving processor to transmit the message and the digest to a separate message transmitting processor;
- operating the message transmitting processor to perform second preselected processing of the message using the network protocol processing information in the digest.

* * * * *